(12) United States Patent
Burgett

(10) Patent No.: US 10,740,875 B1
(45) Date of Patent: Aug. 11, 2020

(54) DISPLAYING OBLIQUE IMAGERY

(71) Applicant: Mapbox, Inc., San Francisco, CA (US)

(72) Inventor: Damon Burgett, Vashon, WA (US)

(73) Assignee: Mapbox, Inc., San Francisco, CA (US)

(*) Notice: Subject to any disclaimer, the term of this patent is extended or adjusted under 35 U.S.C. 154(b) by 0 days.

(21) Appl. No.: 16/509,448

(22) Filed: Jul. 11, 2019

Related U.S. Application Data

(60) Provisional application No. 62/698,731, filed on Jul. 16, 2018.

(51) Int. Cl.
*G06T 3/60* (2006.01)
*G06T 3/00* (2006.01)
*G06T 7/70* (2017.01)
*G06T 11/00* (2006.01)
*G06F 16/29* (2019.01)
*G06T 7/60* (2017.01)

(52) U.S. Cl.
CPC ............. *G06T 3/60* (2013.01); *G06F 16/29* (2019.01); *G06T 3/0006* (2013.01); *G06T 7/60* (2013.01); *G06T 7/70* (2017.01); *G06T 11/00* (2013.01); *G06T 2200/24* (2013.01); *G06T 2207/10032* (2013.01)

(58) Field of Classification Search
CPC .... G06T 3/60; G06T 7/60; G06T 7/70; G06T 3/0006; G06T 11/00; G06T 2200/24; G06T 2207/10032; G06F 16/29
See application file for complete search history.

(56) References Cited

U.S. PATENT DOCUMENTS

| | | | | |
|---|---|---|---|---|
| 5,477,332 A | * | 12/1995 | Stone | G01B 11/255 348/128 |
| 2005/0179788 A1 | * | 8/2005 | Okada | H04N 9/045 348/222.1 |
| 2018/0080771 A1 | * | 3/2018 | Sellars | G08G 5/0021 |

* cited by examiner

*Primary Examiner* — Robert J Craddock
(74) *Attorney, Agent, or Firm* — Fenwick & West LLP

(57) ABSTRACT

An oblique imagery application receives an oblique image captured by an oblique camera at a non-orthogonal angle with respect to a ground plane and map data including a map tile corresponding to geographic coordinates. A principal axis is determined that is orthogonal to an image plane defined by the oblique image and intersecting a center of the oblique image. For each pixel of the oblique image, a pixel vector is determined and a set of deviation coordinates based on a deviation of the pixel vector from the principal axis is determined for the pixel, with the pixel vector of a pixel passing through a focal point of the oblique camera and ending at the pixel. The map tile is associated to the pixels of the oblique image based on the camera parameters, the deviation coordinates of the pixels, the oblique camera parameters, and the geographic coordinates of the map tile.

22 Claims, 12 Drawing Sheets

DISPLAYING OBLIQUE IMAGERY

CROSS REFERENCE TO RELATED APPLICATIONS

This application claims the benefit of and priority to U.S. Provisional Application No. 62/698,731, filed Jul. 16, 2018, the entire contents of which are hereby incorporated by reference for all purposes as if fully set forth herein.

BACKGROUND

This disclosure generally relates to associating images, such as satellite or aerial images, to geographic locations.

When a satellite, aerial device, or the like captures an image of a geographical area, there is uncertainty regarding the precise geographic location captured in the image. For example, various types of image distortions can be caused by an angle of a camera capturing the image with respect to a ground plane or by variations in surface topography. These distortions, among other things, complicate the accurate association of pixels of the image to precise spatial locations. In the case of oblique images, captured at an oblique angle with respect to the ground plane of the earth's surface, associating the pixels in the image to geographic coordinates and displaying the oblique images on a map is difficult to do without significantly distorting the oblique images.

SUMMARY

An oblique imagery application generates an oblique tile corresponding to pixels of an oblique image and to an associated map tile. The oblique image may depict a geographic region and is captured at a non-orthogonal angle with respect to a ground plane for a geographic region. The oblique image may be, for example, an aerial photography image or a satellite image. The oblique camera is associated with oblique camera parameters including a position of the oblique camera, an angular orientation of the oblique camera, and a focal point of the camera. The oblique imagery application determines a principal axis for the oblique image that is orthogonal to an image plane defined by the oblique image, and the principal axis intersects the oblique image at its center.

The map tile includes map data corresponding to geographic coordinates for the geographic region. For each pixel of the oblique image, the oblique imagery application determines a pixel vector and a set of deviation coordinates for the pixel. The pixel vector for a pixel passes through the focal point of the oblique camera and ends at the pixel. The set of deviation coordinates of a pixel are based on a deviation of the pixel vector for the pixel from the principal axis.

The oblique imagery application then associates the map tile to the pixels of the oblique image based on the deviation coordinates of the pixels, the oblique camera parameters, and the geographic coordinates of the map tile. Each pixel is associated to a geographic coordinate of the map tile. The oblique imagery application generates an oblique tile corresponding to the pixels of the oblique image and to the associated map tile. The oblique tile is stored in a database. A graphical user interface (GUI) engine may provide an interface for displaying the oblique images along with a corresponding portion of a map including the associated geographic region, by accessing the generated oblique tile, according to some embodiments. In other embodiments, the oblique tile is used to estimate the height of features depicted in the oblique image.

The figures depict embodiments of the present disclosure for purposes of illustration only. One skilled in the art will readily recognize from the following description that alternative embodiments of the structures and methods illustrated herein may be employed without departing from the principles or benefits of the disclosure described herein.

DETAILED DESCRIPTION

System Overview

Figure 1:
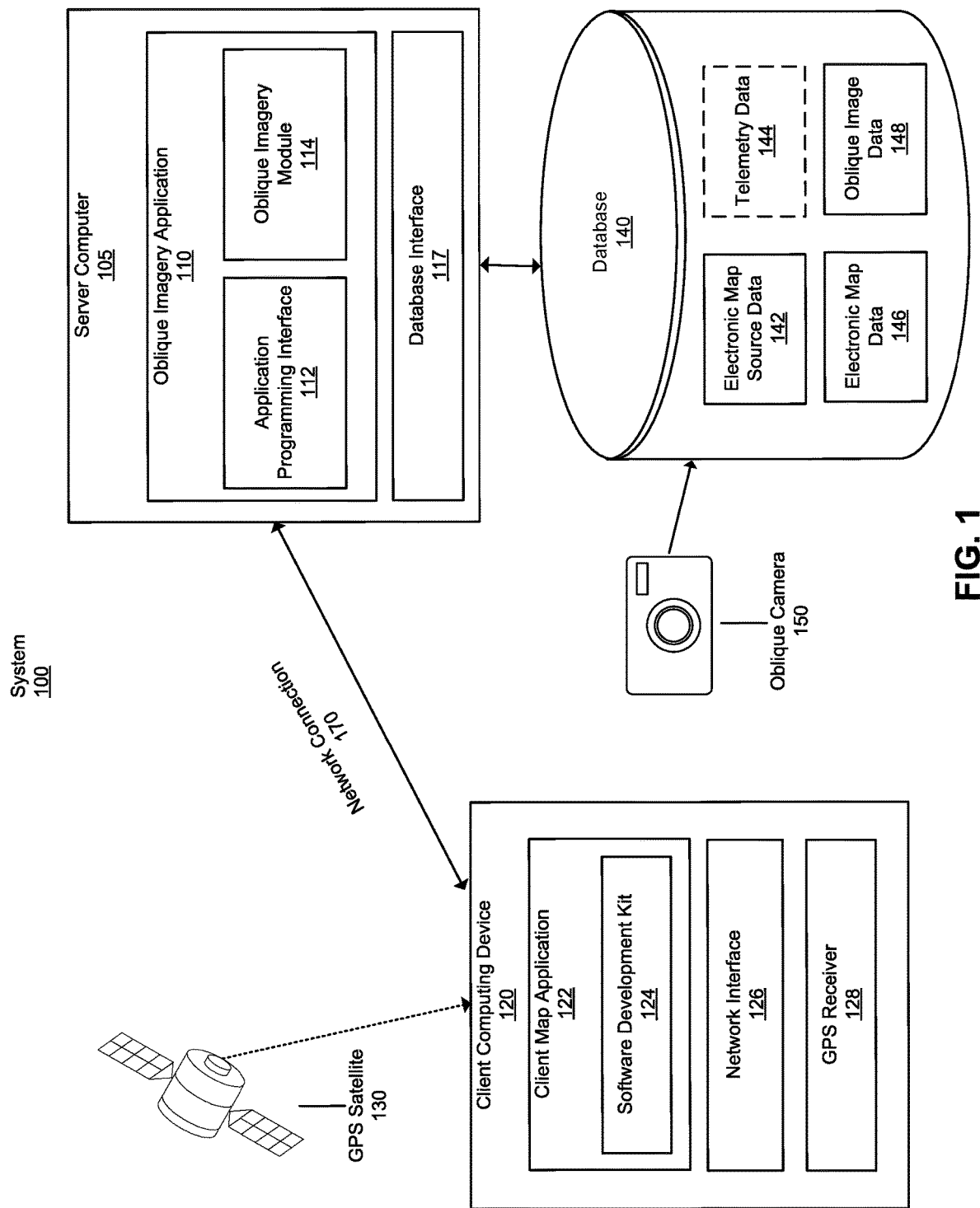
FIG. 1 is a block diagram of a system environment, in accordance with some embodiments.

FIG. 1 is a block diagram of a system environment 100, according to some embodiments. The system 100 comprises a plurality of components that may be implemented at least partially by hardware at one or more computing devices, such as one or more hardware processors executing stored program instructions stored in one or more memories for performing the functions that are described herein. In some embodiments, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

The system 100 includes a server computer 105 including an oblique imagery application 110, a client computing device 120 (or "device 120"), a GPS satellite 130, a database 140, an oblique camera 150, and a network (not shown) for communication between the components of the system 100. The server computer 105 is connected to the database 140 via the network. The server computer 105 is connected to the client computing device 120 via the network through a network connection 170. The network connection 170 may be a wired connection or a wireless connection.

The oblique imagery application 110 includes an application programming interface (API) 112 and an oblique imagery module 114. The server computer 105 includes a database interface 117 for communicating with the database 140. The database 140 comprises electronic map source data 142, telemetry data 144, electronic map data 146, and oblique image data 148.

Server computer 105 may be various computing devices, including but not limited to: servers, racks, work stations, personal computers, general purpose computers, laptops, Internet appliances, wireless devices, wired devices, multi-processor systems, mini-computers, and the like. Although FIG. 1 shows a single server computer 105, the system 100 may include one or more server computers 105, such as a server cluster, and the server computer 105 may be located in one or more physical locations. The server computer 105 may also represent one or more virtual computing instances that execute using one or more computers in a datacenter such as a virtual server farm.

The server computer 105 is communicatively connected to database 140 and the client computing device 120 through any kind of computer network using any combination of wired and wireless communication, including, but not limited to: a Local Area Network (LAN), a Wide Area Network (WAN), one or more internetworks such as the public Internet, or a company network. The server computer 105 may host or execute oblique imagery application 110, and may include other applications, software, and other executable instructions, such as database interface 117.

In one embodiment, database interface 117 is a programmatic interface such as JDBC or ODBC for communicating with database 140. Database interface 117 may communicate with any number of databases and any type of database, in any format. Database interface 117 may be a piece of customer software created by an entity associated with oblique imagery application 110, or may be created by a third-party entity in part or in whole.

The database 140 is a data storage subsystem including programs and data that is stored on any suitable storage device such as one or more hard disk drives, memories, or any other electronic digital data recording device configured to store data. Although database 140 is depicted as a single database in FIG. 1, the database 140 may span multiple devices located in one or more physical locations. For example, the database 140 may include one or nodes located at a data warehouse(s). Additionally, in one embodiment, database 140 may be located on the same device(s) as the server computer 105. Alternatively, database 140 may be located on a separate device(s) from server computer 105.

Database 140 may be in any format, such as a relational database, a noSQL database, or any other format. Database 140 is communicatively connected with the server computer 105 through any kind of computer network using any combination of wired and wireless communication of the type previously described. Optionally, database 140 may be communicatively connected with other components, either directly or indirectly, such as one or more third party data suppliers. Generally, database 140 stores data related to electronic maps including, but not limited to: electronic map source data 142, telemetry data 144, electronic map data 146, and oblique image data 148. In some embodiments, these datasets may be stored as columnar data in a relational database or as flat files.

The electronic map source data 142 includes raw digital map data that is obtained, downloaded, or received from a variety of sources. The raw digital map data may include satellite images, digital street data, building or place data, or terrain data. Example sources include National Aeronautics and Space Administration (NASA), United States Geological Survey (USGS), and DigitalGlobe. Raw digital map data may also be defined by a user and uploaded to the server computer 105. Electronic map source data 142 may be updated at any suitable interval, and may be stored for any amount of time. Once obtained or received, electronic map source data 142 is used to generate electronic map data 146.

The telemetry data 144 includes data received from client computing devices 120. The telemetry data 144 may indicate geographic and/or spatial locations, such as in (X, Y) coordinates, of the devices 120. The server computer 105 captures location data over time from multiple devices 120, such as while users of the devices 120 are traveling.

The oblique image data 148 includes oblique images captured by the oblique camera 150. The oblique camera 150 may be a camera used to capture aerial imagery, according to some embodiments. For example, the oblique camera 150 may be mounted to or otherwise coupled to an airplane, drone, or other aerial vehicle. In other embodiments, the oblique camera 150 is a satellite camera used to capture satellite imagery. The oblique image data 148 may also include metadata associated with the oblique camera 150 and/or the oblique images captured by the oblique camera 150. In some embodiments, the oblique image data 148 includes oblique camera parameters of the oblique camera 150. The oblique camera parameters may include, for example, a geographic and/or spatial location of the oblique camera 150, an angular orientation of the oblique camera 150, a focal point of the camera 150, or some combination thereof.

The electronic map data 146 includes digital map data that is provided, either directly or indirectly, to client map applications, such as client map application 122, using an API. Electronic map data 146 may be generated based on the electronic map source data 142, the telemetry data 144, and the oblique image data 148. The electronic map data 146 includes map tiles corresponding to geographic coordinates associated with oblique images. The electronic map data 146 also includes oblique tiles corresponding to pixels of an oblique image and to the associated map tile. Electronic map data 146 may be updated at any suitable interval, and may include additional information beyond those derived from the electronic map source data 122.

The server computer 105 executes the oblique imagery application 110, which provides the API 112 that may be accessed, for example, by client map application 122 using software development kit (SDK) 124. Specifically, oblique imagery application 110 comprises program instructions that are programmed or configured to perform a variety of backend functions needed for electronic mapping and associating oblique images with map data including, but not limited to: receiving map requests from the devices 120, sending electronic map data to the devices 120, receiving electronic map source data 120 from data providers, processing electronic map source data 142 and telemetry data 144 to generate electronic map data 146, including generating oblique tiles, and any other aspects of embodiments described herein.

The oblique imagery module 114 may include instructions for causing display of a graphical user interface (GUI) of oblique images and associated portions of a map to devices 120. The GUI may be implemented as locally installed software, for example, or using a software as a service architecture in which a web browser accesses the server computer 105 executing the oblique imagery module 114. The server computer 105 generates and sends instructions to the browser to generate the GUI.

The client computing device 120 may include a global positioning system (GPS) receiver 128, the client map application 122, the SDK 124, and the network interface 126. The device 120 may be any computing device and/or mobile computing device, such as a computer, hand-held computer, wearable computer, cellular or mobile phone, portable digital assistant (PDA), tablet computer, and the like. In some embodiments, the device 120 is an onboard GPS device of an automobile navigation system. In other embodiments, the client computing device 120 has a different configuration, such as having a different number of components. For example, the client computing device 120 may not include the GPS receiver 128.

The GPS receiver 128 receives data from a set of GPS satellites 130 that can be used to determine the location of the device 120. For example, GPS satellites 130 broadcast timing signals to the device 120, and the GPS receiver 128 determines its coordinates based on the received signals. In addition to or alternative to GPS coordinates, the location data may be generated based on local cellular, Wi-Fi, Bluetooth, and/or cell tower triangulation. Multiple techniques for gathering location data may be used to improve the accuracy spatial locations defined by the location data. The device 120 transmits the location data to the server computer 105 to facilitate determination of spatial of location of captured images.

The device 120 also includes network interface 126, which is used by the device 120 to communicate with other devices. In particular, network interface 126 is used to establish a connection to the server computer 105 via the network. Network interface 126 may use Ethernet, WiFi, WiMAX, Bluetooth, ZigBee, cellular standards, or others.

The device 120 may include other hardware components, such as one or more input devices, memory, processors, and the like, which are not depicted in FIG. 1. The device 120 also includes applications, software, and other executable instructions to facilitate various aspects of embodiments described herein. These applications, software, and other executable instructions may be installed by a user, owner, manufacturer, or other entity related to the device 120.

In some embodiments, the device 120 includes client map application 122, which is software that displays, uses, supports, or otherwise provides electronic mapping functionality as part of the application or software. Client map application 122 may be any type of application, such as a taxi service, a video game, a chat client, a food delivery application, etc. In an embodiment, client map application 122 obtains electronic mapping functions through SDK 124, which may implement functional calls, callbacks, methods, or other programmatic means for contacting the server computer to obtain digital map tiles, layer data, oblique images, or other data that can form the basis of visually rendering a map and/or oblique images as part of the application 122. In general, SDK 124 allows developers to implement electronic mapping without having to design all of the components from scratch. For example, SDK 124 may be downloaded from the Internet by developers, and subsequently incorporated into an application which is later used by individual users.

According to one embodiment, the techniques described herein are implemented by one or more special-purpose computing devices. For example, the server computer 105 and client computing device 120 may be computer devices configured as special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and program logic to implement the techniques.

Figure 2:
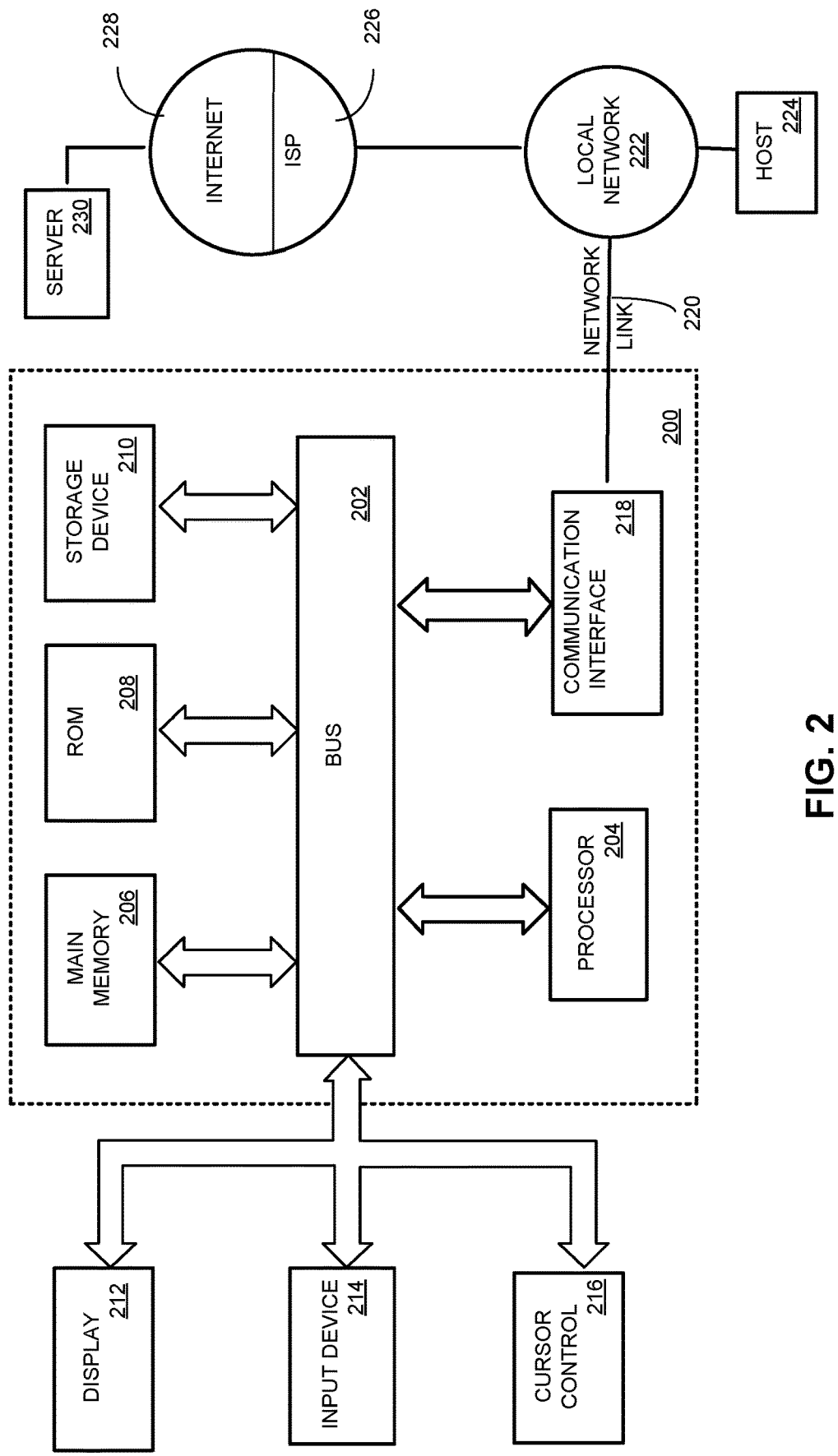
FIG. 2 is an example of a computing device, in accordance with some embodiments.

FIG. 2 is an example of a computing device, in accordance with some embodiments. The computing device 200 may be used as part of the client computing device 120, the server computer 105, other components of the system 100, or some combination thereof. Computing device 200 includes a bus 202 or other communication mechanism for communicating information, and a hardware processor 204 coupled with bus 202 for processing information. Hardware processor 204 may be, for example, a general purpose microprocessor.

Computing device 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computing device 200 into a special-purpose machine that is customized to perform the operations specified in the instructions.

Computing device 200 further includes a read only memory (ROM) 208 or other static storage device coupled to bus 202 for storing static information and instructions for processor 204. A storage device 210, such as a magnetic disk, optical disk, or solid-state drive is provided and coupled to bus 202 for storing information and instructions.

Computing device 200 may be coupled via bus 202 to a display 212, such as a cathode ray tube (CRT), LCD screen, LED screen, or touch screen, for displaying information to a computer user. An input device 214, which may include alphanumeric and other keys, buttons, a mouse, a touchscreen, or other input elements, is coupled to bus 202 for communicating information and command selections to processor 204. In some embodiments, the computing device 200 may also include a cursor control 216, such as a mouse, a trackball, or cursor direction keys for communicating direction information and command selections to processor 204 and for controlling cursor movement on display 212. The cursor control 216 typically has two degrees of freedom in two axes, a first axis (e.g., x) and a second axis (e.g., y), that allows the device to specify positions in a plane.

Computing device 200 may implement the techniques described herein using customized hard-wired logic, one or more ASICs or FPGAs, firmware and/or program logic which in combination with the computer system causes or programs computing device 200 to be a special-purpose machine. According to one embodiment, the techniques herein are performed by computing device 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 210. Volatile media includes dynamic memory, such as main memory 206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic, radio, or light waves, such as those generated during radio-wave and infra-red data communications, such as WI-FI, 3G, 4G, BLUETOOTH, or wireless communications following any other wireless networking standard.

Various forms of media may be involved in carrying one or more sequences of one or more instructions to processor 204 for execution. For example, the instructions may initially be carried on a magnetic disk or solid-state drive of a remote computer. The remote computer can load the instructions into its dynamic memory and send the instructions over a telephone line using a modem. A modem local to computing device 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computing device 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computing device 200, are example forms of transmission media.

Computing device 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution.

Figure 3:
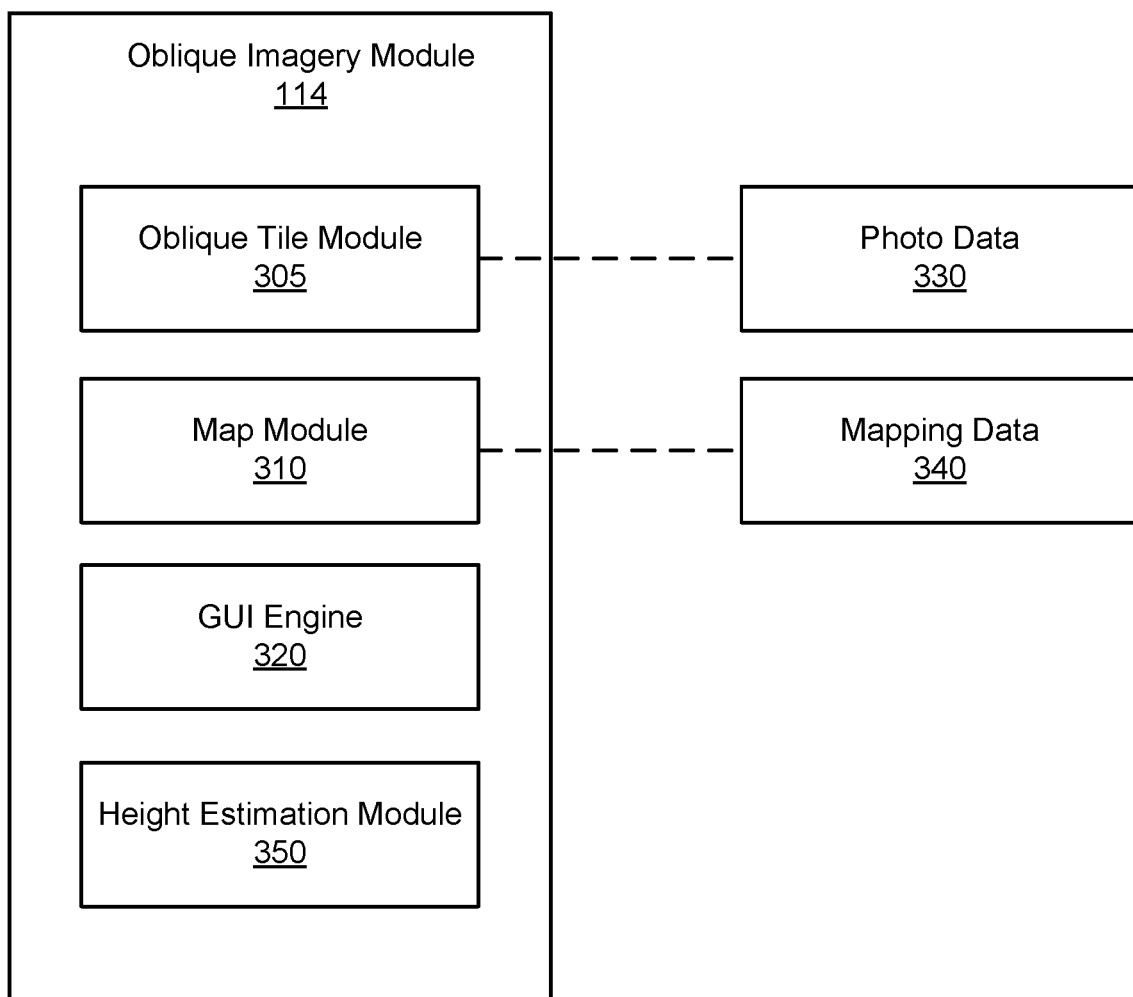
FIG. 3 is a block diagram illustrating an oblique imagery module, according to some embodiments.

FIG. 3 is a block diagram illustrating an oblique imagery module, according to some embodiments. The oblique imagery module 114 includes an oblique tile module 305, a map module 310, a GUI engine 320, and a height estimation module 350. The oblique tile module 305 receives photo data 330, including an oblique image captured by the oblique camera 150 at a non-orthogonal angle with respect to a ground plane. The photo data 330 may be obtained from the oblique image data 148. The ground plane is a plane approximating the surface of the earth at a location corresponding to the oblique image. The photo data 330 received by the oblique tile module 305 also includes the oblique camera parameters of the oblique camera 150. The oblique camera parameters may include a geographic and/or spatial location of the oblique camera 150, an angular orientation of the oblique camera 150, a focal point of the camera 150, or some combination thereof. In some embodiments, the oblique camera parameters may also include one or more of an image size, a pixel size, a focal length, and a location of a principal point. The principal point may be a point on the oblique image corresponding to a center of the oblique image.

The map module 310 receives mapping data 340 from the electronic map data 146 based on the oblique image data. The mapping data 340 includes a map tile corresponding to geographic coordinates. The geographic coordinates include at least coordinates that correspond to geographic locations shown in the oblique image. For example, if the oblique image is an image of a building, the map tile includes at least geographic coordinates corresponding to the location of the building.

For a received oblique image, the oblique tile module 305 determines a principal axis in three-dimensional space, with the principal axis orthogonal to an image plane defined by the oblique image and intersecting a center of the oblique image. In some embodiments, the oblique tile module 305 determines a principal point on the oblique image where the principal axis intersects the image plane.

The oblique tile module 305 then determines a pixel vector for each of the pixels of the oblique image. For each pixel, a pixel vector originates at the focal point of the oblique camera and continues through the pixel. The oblique tile module 305 generates a set of deviation coordinates for each pixel vector. The deviation coordinates describe a deviation of the pixel vector from the principal axis. In some embodiments, the deviation coordinates are vector coordinates for a vector that describes the deviation of the pixel vector from a principal vector parallel to the principal axis. In this case, the principal vector originates at the focal point of the oblique camera and ends at the center of the oblique image. In other embodiments, the deviation coordinates are angular coordinates which describe an angular deviation of the pixel vector from the principal axis. In some embodiments, the angular coordinates include a latitude coordinate indicating a vertical deviation of the pixel vector from the principal axis and a longitude coordinate indicating a horizontal angular deviation from the principal axis.

Using the deviation coordinates corresponding to the pixels of the oblique image, the oblique tile module 305 associates the map tile with the pixels of the oblique image. In particular, the oblique tile module 305 associates a geographic coordinate of the map tile with each pixel of the oblique image, based on the deviation coordinates for the pixel, the oblique camera parameters, and the geographic coordinates of the map tile. Alternatively, the oblique tile module 305 associates each pixel of the oblique image with a geographic coordinate of the map tile, based on the deviation coordinates for the pixel, the oblique camera parameters, and the geographic coordinates of the map tile. The oblique tile module 305 stores the oblique tile along with data associating the pixels of the oblique image with the map tile as electronic map data 146 in the database 140.

The GUI engine 320 provides an interactive GUI for viewing maps and oblique images. In some embodiments, the GUI displays the oblique image and a portion of a map corresponding to the map tile associated with the oblique image simultaneously. In some embodiments, the GUI displays the portion of the map as an oblique map view, where the portion of the map is shown from a perspective corresponding to the non-orthogonal angle of the oblique image. The GUI may display the oblique image overlaid on the portion of the map, according to some embodiments. Examples of displays provided by the GUI engine 320 are shown in FIGS. 7-10.

The height estimation module 350 estimates a height of a feature in an oblique image based on data from the oblique tile generated by the oblique tile module 350. The height estimation module 350 estimates the height of the feature (e.g., a building) based on inputs indicating a pixel corresponding to a top point of the feature and based on inputs indicating a pixel corresponding to a base point of the feature. Using the geographic coordinates of the map tile associated with the oblique image for the top point pixel and base point pixel, the height estimation module 350 generates an estimated height of the feature. In some embodiments, the GUI engine 320 displays the estimated height of the feature overlaid on the oblique image. Estimating the height of a feature is described in greater detail with respect to FIGS. 9 and 10.

Associating Oblique Images with Map Tiles

Figure 4:
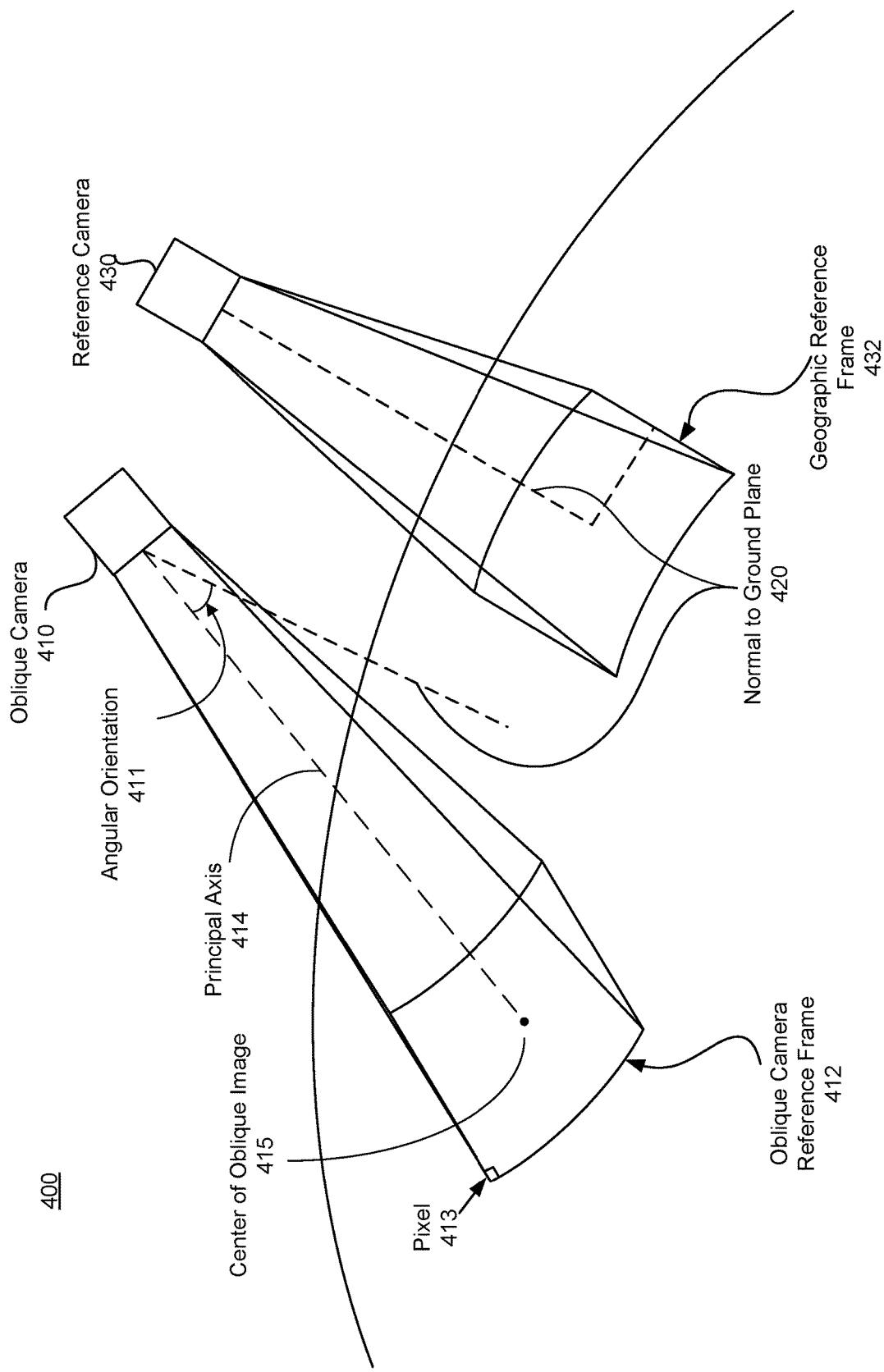
FIG. 4 illustrates an oblique camera used to capture an oblique image and a reference camera used to capture an image at an orthogonal angle, in accordance with some embodiments.

FIG. 4 illustrates an oblique camera used to capture an oblique image and a reference camera used to capture an image at an orthogonal angle, in accordance with some embodiments. The oblique camera 410 captures an oblique image at a non-orthogonal angle (non-normal) with respect to a ground plane, which is described by the angular orientation 411. The angular orientation 411 may be described by a set of angular coordinates, for example a vertical angular coordinate and a horizontal angular coordinate, each indicating an angular deviation of the principal axis from a normal to ground plane 420. The oblique camera 410 captures a portion of the earth's surface included in a reference frame 412 of the oblique camera 410. The oblique camera reference frame 412 may include recognizable objects, such as buildings, land topography, plants, landmarks, and the like. While the oblique image itself is rectangular, the geographic region captured in the oblique camera reference frame 412 may not be rectangular due to the perspective of the oblique camera 410.

The oblique images include a set of pixels 413. Each pixel 413 corresponds to a geographic location. The size of the pixel, with regards to how much geographic space corresponds to the pixel, is determined based on the oblique camera parameters, including resolution of the oblique camera 410, the angular orientation 411, the spatial location of the oblique camera 410, and the location of the pixel 413 with respect to the oblique camera reference frame 412. A principal axis 414 extends from a focal point of the oblique camera 410 to the center of the oblique image 415. According to some embodiments, the principal axis also intersects the position of the oblique camera 410. The position of the oblique camera 410 is a point in 3D space corresponding to the focal point of the oblique camera 410, relative to the oblique camera reference frame 412. A set of coordinates may indicate the position of the oblique camera. In some embodiments, a set of geographic coordinates including a geographic latitude coordinate, a geographic longitude coordinate, and an elevation coordinate indicate the position of the oblique camera. In alternate embodiments, the position of the oblique camera is defined by a plurality of points in 3D space, corresponding to different portions of the oblique camera 410. In the case where the oblique camera 410 is an aerial imagery camera, the position of the oblique camera 410 corresponds to a position of an aircraft that the oblique camera 410 is mounted to.

FIG. 4 also shows a reference camera 430 captures an image in a reference frame 432 at an orthogonal (normal) orientation. In this case, the normal to ground plane 420 is the principal axis for the reference camera 430. The perspective of the reference camera 430 and geographic reference frame 432 may correspond to a view of a portion of a 2D map, from a top-down perspective with respect to the ground plane. Since the perspective of the reference camera 430 is top-down, images from the reference camera or views of a 2D map may not capture depth of features in the image. In some examples, the oblique camera reference frame 412 and the geographic reference frame 432 overlap, capturing the same geographic locations. However, simply associating the pixels 413 with the locations in the geographic reference frame 432 results in a warping of the oblique image. The oblique tile module 305 associates the pixels 413 with the locations in the geographic reference frame 432 without warping of the oblique image, using the deviation coordinates generated for each of the pixels 413.

Figure 5:
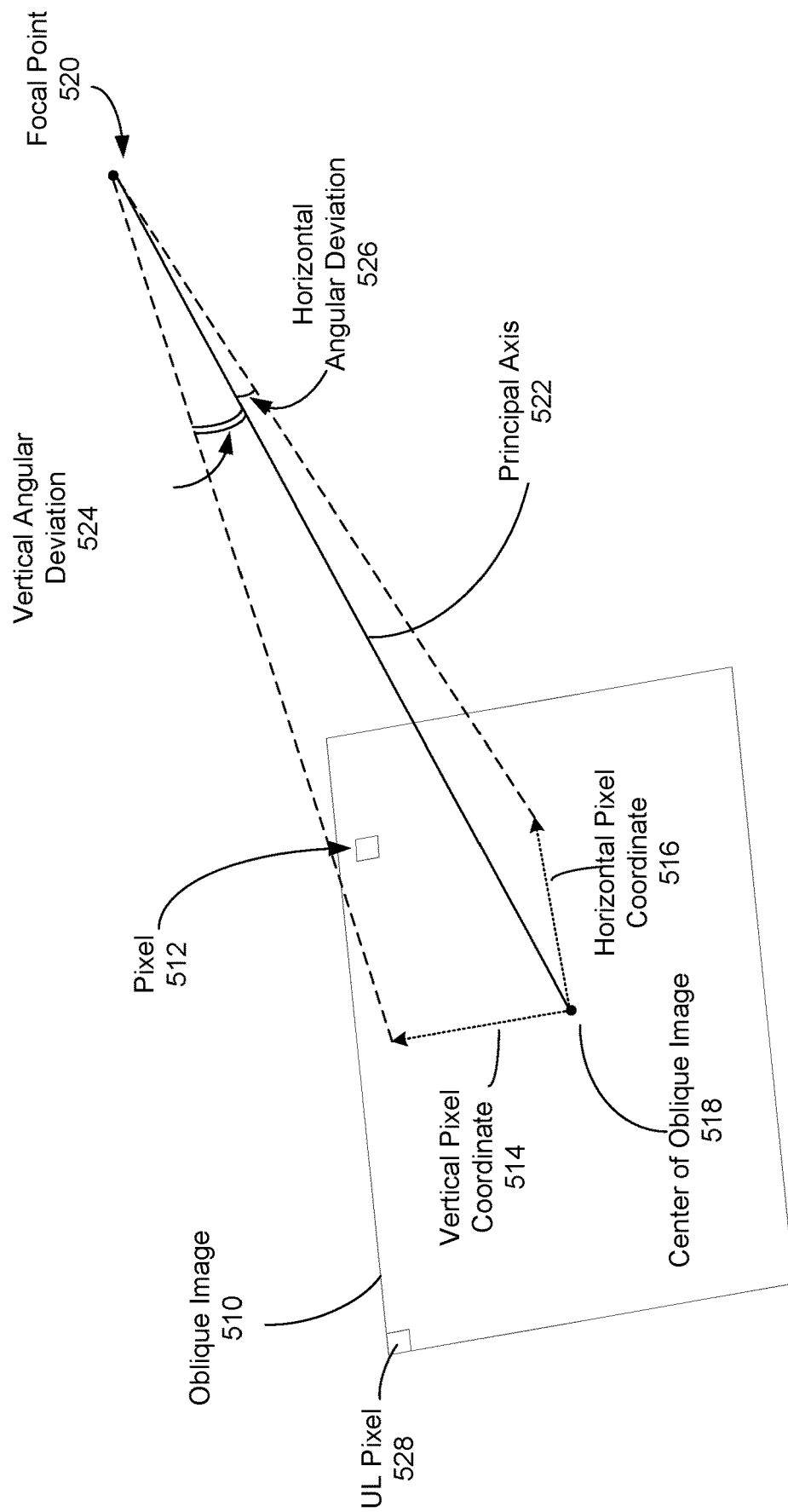
FIG. 5 illustrates deviation coordinates of a pixel of an oblique image with respect to a principal axis, in accordance with some embodiments.

FIG. 5 illustrates deviation coordinates of a pixel of an oblique image with respect to a principal axis, in accordance with some embodiments. The oblique image 510 includes a set of pixels 512. The oblique image 510 was obtained by an oblique camera, e.g., the oblique camera 410, and has associated camera parameters, including a focal point 520. Each pixel has a set of pixel coordinates describing the location of a pixel 512 with respect to the center of the oblique image 518. The pixel coordinates include a vertical pixel coordinate 514 and a horizontal pixel coordinate 516.

For example, the pixels may be stored as a data table, with the vertical pixel coordinate 514 indicating a row of the data table and the horizontal pixel coordinate 516 indicating a column of the data table. The pixel coordinates may indicate the position of the center of the pixel 512, as shown in FIG. 5, or some other position within the pixel 512 (e.g., one of the corners of the pixel). In some embodiments, the center of the oblique image 518 is set as the origin for the coordinate system of the pixel coordinates, with the coordinates (0, 0) indicating the center of the oblique image 518.

An image plane is defined by the oblique image which is parallel to the oblique image 510 and completely overlapping the oblique image 510, as it appears in FIG. 5. A principal axis 522 passes through the focal point 520 and intersects the center of the oblique image 518. The principal axis 522 is perpendicular to the image plane and also the oblique image 510. The distance from the focal point 520 to the image plane and the oblique image 520 is equal to the focal length of the camera.

Each pixel 512 is also described by the pixel vector that originates at a focal point 520 and ends at the position of the pixel 512 defined by the pixel coordinates, e.g., the center of the pixel 512. FIG. 5 shows deviation coordinates which are angular coordinates that describe the angular deviation of a pixel vector from the principal axis. In other embodiments, other types of deviation coordinates are used. The angular coordinates include a vertical angular deviation 524 and a horizontal angular deviation 526, according to some embodiments. The origin of the angular coordinates corresponds to the center of the oblique image 518, with the coordinates (0°, 0°) indicating the center of the oblique image 518.

In some embodiments, the oblique tile module 305 applies an affine transformation to the oblique image to generate the angular coordinates for each pixel of the oblique image. The affine transformation may be represented by an affine transformation matrix A:

$$A = \begin{pmatrix} 0.5\phi & 0 & \phi/c \\ 0 & -\phi/r & 0.5\theta \end{pmatrix}$$

where $\phi$ is the total angular horizontal range, $\theta$ is the total angular vertical range, r is the total number of rows in the oblique image (i.e. number of rows of pixels), and c is the total number of columns in the oblique image (i.e. number of columns of pixels). The total angular horizontal range $\phi$ indicates the horizontal angular deviation from one vertical edge of the oblique image 510 to the opposite vertical edge of the oblique image 510. The total vertical range $\theta$ indicates the vertical angular deviation from one horizontal edge of the oblique image 510 to the opposite horizontal edge of the oblique image 510. Each pixel is represented by a set of coordinates (x, y, z), where x is a column of the pixel, y is a row of the pixel, and z represents the length of the principal axis from the center of the oblique image 518 to the focal point 520. In some embodiments, z is estimated as constant for each pixel. Applying the affine transformation to the set of coordinates (x, y, z) for a pixel results in the angular coordinates (vertical angular deviation 524 and horizontal angular deviation 526) for the pixel. The generated angular coordinates for the pixel may include a third coordinate. The third coordinate may represent a distance of the pixel from the focal point. In some embodiments, the generated third coordinate is not used when associating a map tile with the oblique image 510. In some embodiments, the generated third coordinate is estimated to be the focal length.

By transforming the pixel coordinates to deviation coordinates, the pixels 512 of the oblique image 510 can be associated with geographic locations of a map tile without significantly warping the image. The oblique tile module 305 generates an oblique tile, including data corresponding to the associated oblique image 510 and the map tile. The oblique tile module 305 stores the oblique tile as electronic map data 130. The oblique tile may be accessed by, for example, the client map application 122 for providing the oblique images associated with a geographic region of interest to a user. In other embodiments, the oblique tile is accessed by the GUI engine 320 for displaying the oblique image 510 and an associated portion of a map.

In order to associate a map tile with the pixels 512 of the oblique image 510, the oblique tile module transforms geographic coordinates for locations on a map tile to angular deviation coordinates, according to some embodiments. The map tile includes geographic locations associated with the oblique image 510. In some embodiments, a center geographic location corresponding to the center of the oblique image 518 is initially identified and included in the map tile, and geographic locations surrounding the center geographic location are subsequently included in the map tile. For example, the center geographic location may be identified based on the position of the oblique camera and the angular orientation of the oblique camera. The geographic coordinates for each location on the map tile are transformed to a corresponding horizontal angular coordinate and a corresponding vertical angular coordinate. Each location on the map tile is then associated with a pixel 512 of the oblique image 510 that has the same angular coordinates. In some embodiments, the geographic coordinates are geographic latitude and longitude coordinates. In other embodiments, the geographic coordinates may be in a different coordinate system. The elevation of each location on the map tile may be estimated to be a constant value, according to some embodiments. In further embodiments, the constant value is an average elevation value determined based on elevation data accessed from an elevation database.

In other embodiments, the oblique tile module 305 applies an affine transformation to the oblique image to generate unit deviation coordinates for each pixel 512 of the oblique image. The unit deviation coordinates estimate the deviation of the respective pixel vector from the principal axis 522. The unit deviation coordinates for each pixel 512 represent a deviation vector describing a deviation of a corresponding pixel unit vector from a principal vector. The principal vector originates at the focal point 520 and ends at the center of the oblique image 518. Each pixel unit vector is a vector with a length corresponding to the distance between the focal point 520 and the image plane. In some embodiments, the distance between the focal point 520 and the image plane is the focal length of the camera. The oblique tile module 305 may normalize this distance to 1, in the coordinate system of the oblique tile module 305. The pixel unit vector originates at the focal point 520 and points towards the respective pixel, following a line that intersects both the focal point 520 and the respective pixel. In some embodiments, the coordinate system of the oblique image module 305 uses arbitrary units which indicate a relative distance between objects, with the focal length of the camera being 1 unit. In other embodiments, the coordinate system of the oblique image module 305 may use standard units of distance, such as, for example, a kilometer.

The unit deviation coordinates and coordinates describing each pixel unit vector may be 3D coordinates in a coordinate system of the oblique image module 305. The coordinate system of the oblique image module 305 may include a horizontal axis (also referred to as an "X axis" herein), a vertical axis (also referred to as a "Y axis" herein), and depth axis (also referred to as a "Z axis" herein), with an origin at the focal point 520. The X and Y axes are each parallel to the oblique image 510. The Z axis is perpendicular to the oblique image 510 intersects the center of the oblique image 518. A depth coordinate for a point (also referred to as a "Z coordinate" herein) corresponding to the Z axis, represents a distance along the Z axis from the focal point 520 to a point. In some embodiments, the depth coordinate is approximated to be constant for each pixel 512 in the oblique image 510. In further embodiments, the depth coordinate is estimated to be the focal length of the camera for each pixel 512 in the oblique image 510.

The affine transformation for generating unit deviation coordinates may be represented by an affine transformation matrix A:

$$A = \begin{pmatrix} \Delta X & 0 & X_{UL} \\ 0 & \Delta Y & Y_{UL} \end{pmatrix}$$

where $\Delta X$ is a deviation width of a pixel, $\Delta Y$ is a deviation height of a pixel, $X_{UL}$ is a horizontal coordinate corresponding to a pixel in the upper most left corner of the oblique image (UL pixel 528), and a $Y_{UL}$ is a vertical coordinate corresponding to the UL pixel 528. The deviation width of a pixel is a value approximating a deviation between a pixel unit vector for a pixel and another pixel unit vector for another pixel directly adjacent in a horizontal direction. The deviation height is a value approximating a deviation between a pixel unit vector for a pixel and another pixel unit vector for another pixel directly adjacent to the pixel in a vertical direction. The horizontal coordinate $X_{UL}$ is a horizontal coordinate of the pixel unit vector for the UL pixel 528. The vertical coordinate $Y_{UL}$ is a vertical coordinate of the pixel unit vector for the UL pixel 528.

Each pixel is represented by a set of coordinates (x, y, z), where x is a column of the pixel, y is a row of the pixel, and z represents the distance from the center of the oblique image 518 to the focal point 520. Applying the affine transformation for generating the unit deviation coordinates to the set of coordinates (x, y, z) for a pixel results in unit deviation coordinates of a deviation vector for the pixel. The unit deviation coordinates estimate a deviation of a vector associated with a pixel (pixel unit vector) from the principal axis, similarly to the angular coordinates (vertical angular deviation 524 and horizontal angular deviation 526), as shown in FIG. 5. The generated unit deviation coordinates also include a generated third coordinate. In some embodiments, the generated third coordinate for each pixel is estimated to be constant for each pixel 512 in the oblique image 510. In some embodiments the generated third coordinate is estimated to be zero for each pixel 512 in the oblique image 510. In some embodiments, the generated Z coordinate is not used in associating a map tile with the oblique image 510.

In order to generate the oblique tile, the oblique tile module transforms geographic coordinates for locations on a map tile to unit deviation coordinates, according to some embodiments. The map tile includes locations associated with the oblique image 510. In some embodiments, a center geographic location corresponding to the center of the oblique image 518 is initially identified and included in the map tile, and geographic locations surrounding the center geographic location are subsequently included in the map tile. For example, the center geographic location may be identified based on the position of the oblique camera and the angular orientation of the oblique camera. The geographic coordinates for each location on the map tile are transformed to a set of corresponding unit deviation coordinates. Each location is then associated with a pixel 512 of the oblique image 510 that has the same unit deviation coordinates. In some embodiments, the geographic coordinates are geographic latitude and longitude coordinates. In other embodiments, the geographic coordinates may be in a different coordinate system. The elevation of each location on the map tile may be estimated to be a constant value, according to some embodiments. In further embodiments, the constant value is an average elevation value determined based on elevation data accessed from an elevation database.

Figure 6:
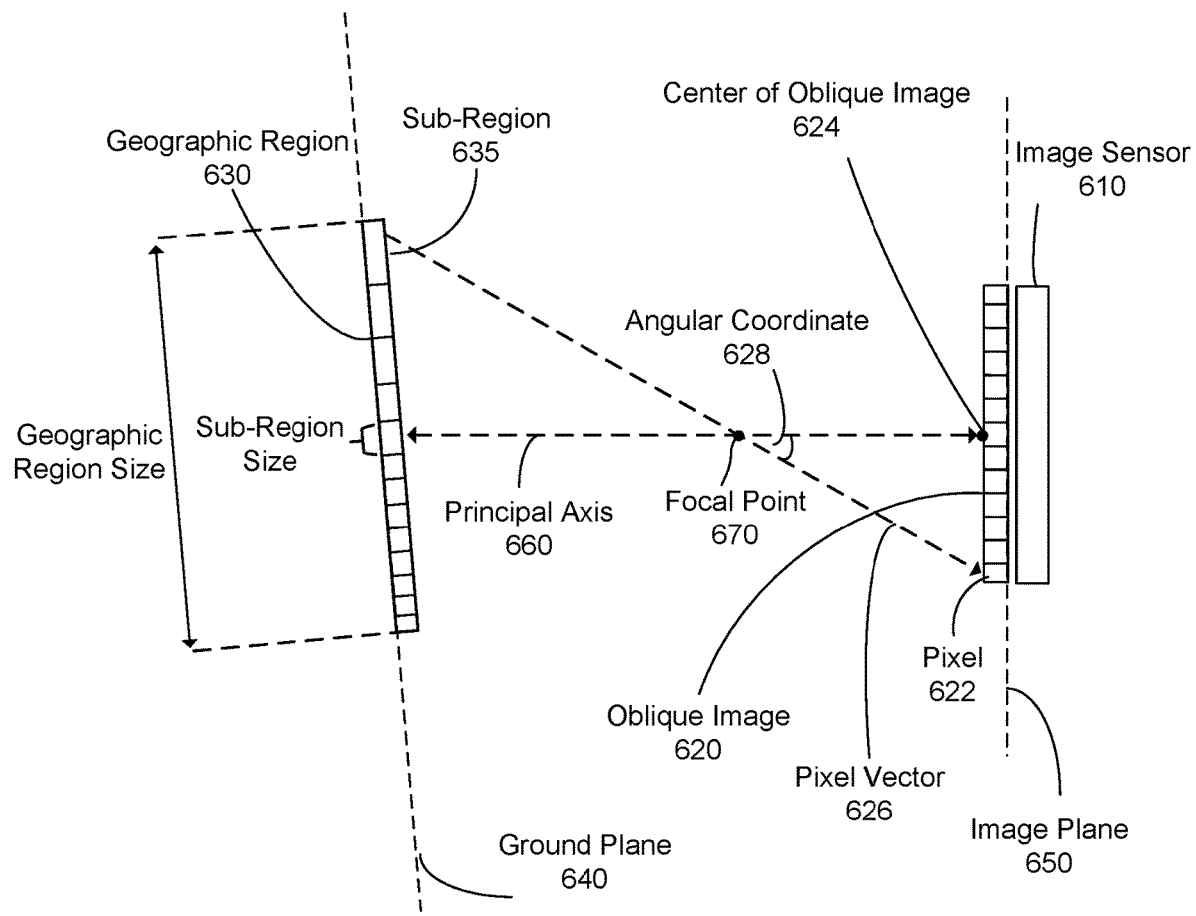
FIG. 6 illustrates pixel vectors of an oblique image, in accordance with some embodiments.

FIG. 6 illustrates pixel vectors of an oblique image, in accordance with some embodiments. An oblique camera having an image sensor 610 and a focal point 670 captures an oblique image 620 of a geographic region 630 at a non-orthogonal angular orientation with respect to the ground plane 640 for the geographic region 630. The ground plane may be an average ground plane approximating the surface of the Earth at the geographic region 630. The angular orientation is the angle between the orientation of the ground plane 640 and an image plane 650 where an image is formed on the image sensor 610. Each pixel of the oblique image 620 corresponds to a respective sub-region of the geographic region 630. For example, the pixel 622 correspond to the sub-region 635 of the geographic region 630. The size of a sub-region is determined based on the location of the corresponding pixel, the angular orientation of the oblique camera, the focal point 670 of the oblique camera, the imaging resolution of the image sensor 610, and the spatial location of the oblique camera relative to the geographic region 630. Due to the non-orthogonal angular orientation of the oblique camera, the relative sizes of the sub-regions are not uniform, and depend on the perspective of the oblique camera with respect to the geographic region 630.

A principal axis 660 passes through the focal point 670 of the oblique camera and ends at a center of the oblique image 624. The principal axis 660 is orthogonal to the image plane 650. The principal axis is not perpendicular to the ground plane 640. For the pixel 622, the oblique tile module 305 determines a pixel vector 626 that passes through the focal point 670 and ends at the pixel 622. An angular coordinate 628 describes the angular deviation of the pixel vector 626 from the from the principal axis 660. The angular coordinate 628 is an embodiment of the set of deviation coordinates which includes a set of coordinates representing a horizontal angular deviation and a vertical angular deviation, as shown in FIG. 5. In alternate embodiments, the location of the pixel may be described by unit deviation coordinates.

Figure 7:
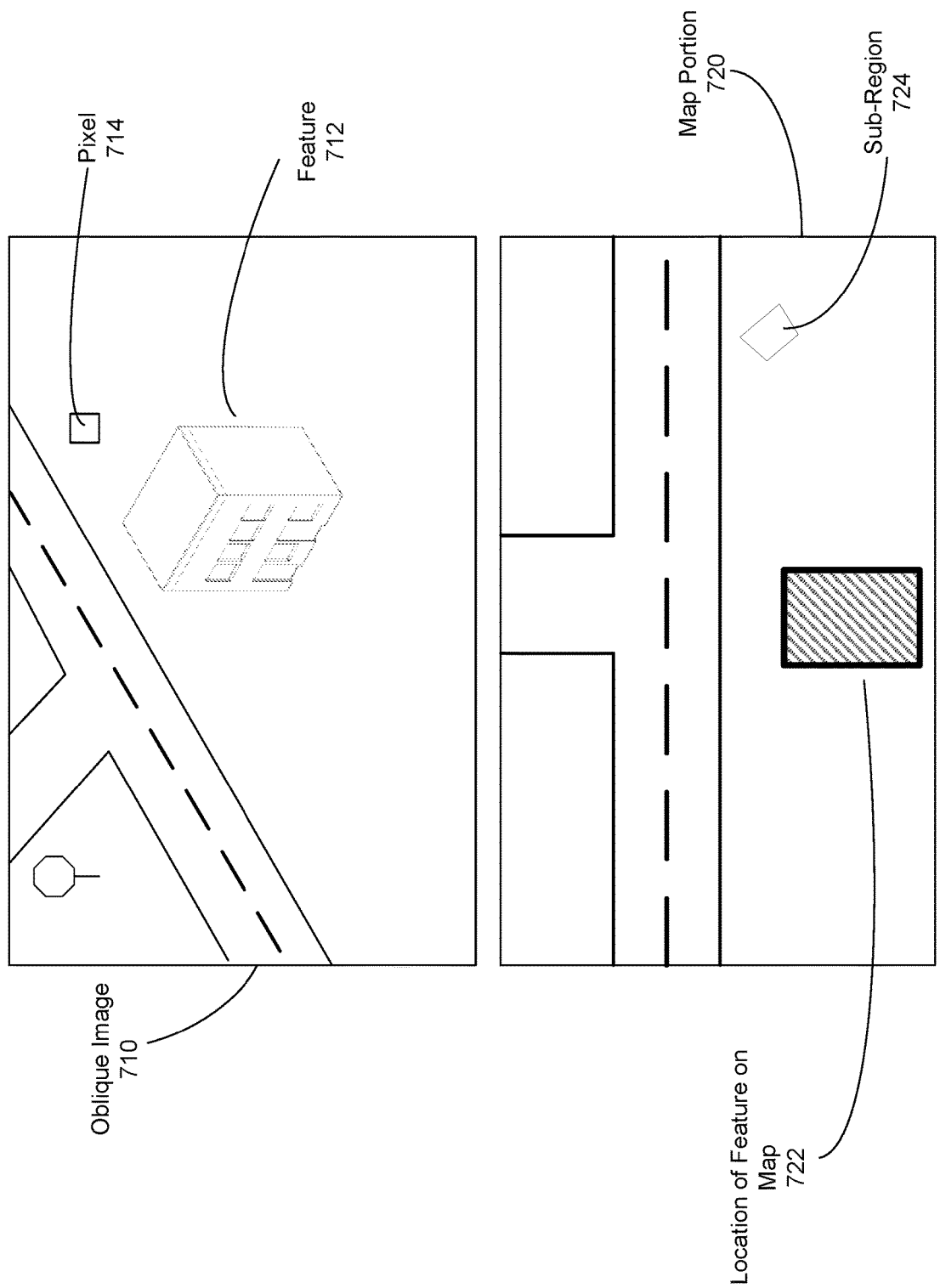
FIG. 7 is an example of an oblique image and a corresponding portion of a map, in accordance with some embodiments.

FIG. 7 is an example of an oblique image and a corresponding portion of a map, in accordance with some embodiments. In some embodiments, the GUI engine 320 displays, in an interface, an oblique image 710 and a map portion 720 corresponding to a map tile that has been associated with the oblique image 710 by the oblique tile module 305. The GUI engine 320 may display the oblique image 710 and the map portion 720 simultaneously. The interface provides a method of displaying oblique imagery associated with a geographic region of interest to a user. For example, a user may be interested in viewing an image of feature 712 of the geographic region at a location 722 on the portion of the map 720 from a perspective that is not top-down. The user may be able to select to view the oblique image 710 for the portion of the map 720, e.g., by selecting the feature 722 in the map portion 720. In response to receiving the user selection of the feature 722, the GUI engine 320 retrieves the associated oblique image 710 from the oblique image data 148 and displays the oblique image 710. An example of a feature 712 is a building, as shown in FIGS. 7-10.

Each pixel of the oblique image 710 is associated with a sub-region of the geographic region that is included in the map portion 720. An example of a pixel 714 and an associated sub-region 724 is shown. According to some embodiments, the sub-region 724 may not be the same shape as the pixel 714 (which may be approximately square). The size of each associated sub-region may not be uniform, as described with respect to FIG. 6. Using the oblique tiles generated by the oblique tile module 305, the pixel 714 can be associated with sub-region 724 without significantly warping the oblique image 710.

Figure 8:
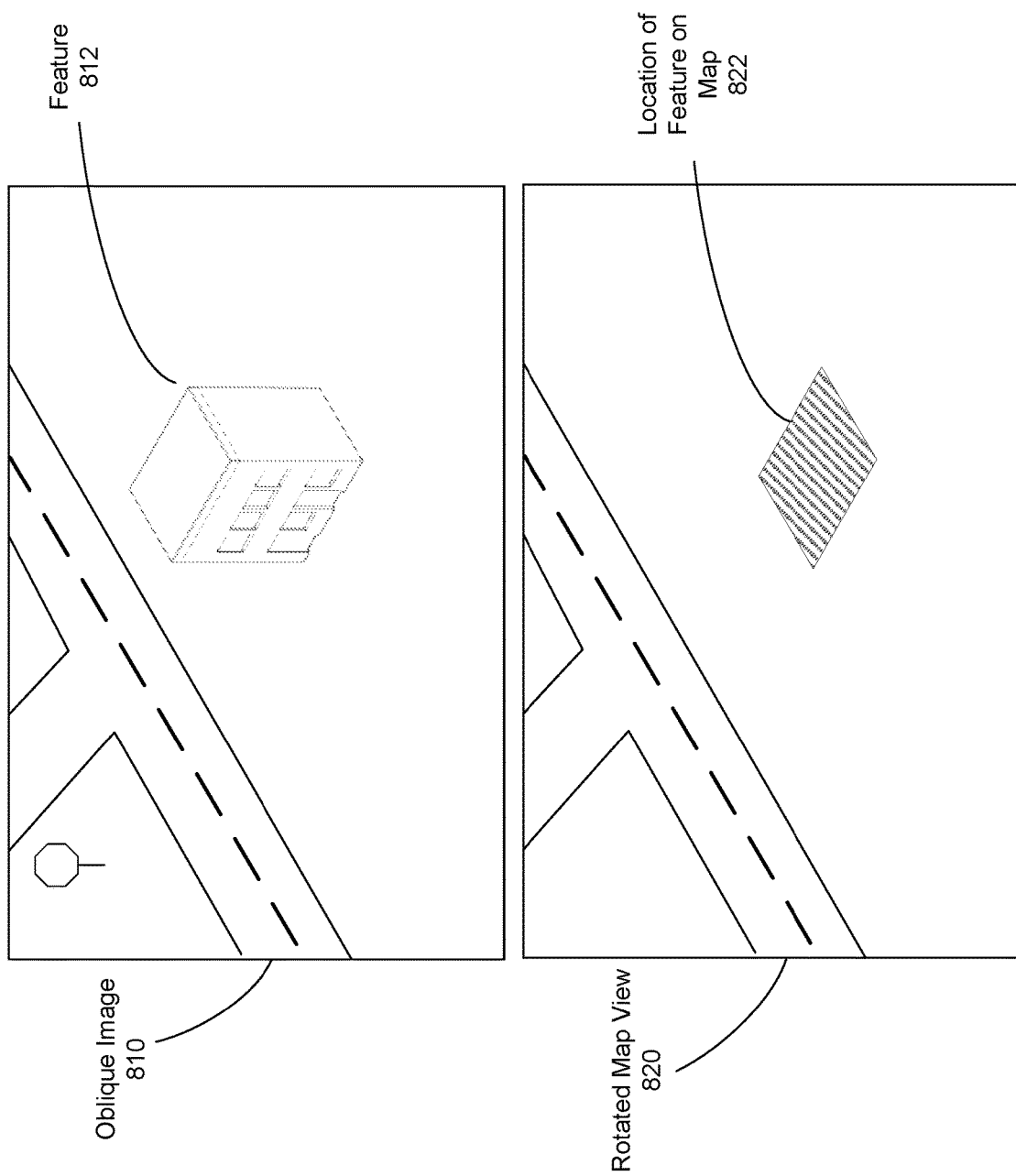
FIG. 8 is an example of an oblique image and a corresponding rotated portion of a map, in accordance with some embodiments.

FIG. 8 is an example of an oblique image and a corresponding rotated portion of a map, in accordance with some embodiments. The GUI engine 320 displays, in an interface, an oblique image 810 and a rotated map view 820 (also referred to as the "oblique map view" herein) showing a portion of a map corresponding to a geographic region which the oblique imagery application has associated with the oblique image 810. The rotated map view 820 shows the geographic region from a perspective corresponding to the non-orthogonal angular orientation of the oblique camera used to capture the oblique image 810. For example, the rotated map view 820 shows the geographic region from the same perspective as the oblique camera, as shown in FIG. 8. A location of a feature 822 on the rotated map view 820 correspond to the location of the feature 812 in the oblique image 810.

The rotated map view 820 may be generated using a virtual map camera, which determines the rotated map view 820 of the associated geographic region that is displayed in the interface. The virtual map camera has parameters that correspond to the oblique camera parameters corresponding to the oblique image 810. In particular, the parameters of the virtual camera include a position of the virtual camera, an angular orientation of the virtual camera, and a focal point of the virtual camera, according to some embodiments. To generate the rotated map view 820, the GUI engine 320 determines a principal point on the portion of the map corresponding to the center of the oblique image. For each corner of the portion of the map, the GUI engine 320 also determines a set of deviation coordinates for the corner, according to some embodiments. The corners of the portion of the map are determined based on the geographic latitude coordinate and the geographic longitude coordinate determined for each corner pixel of the oblique image, as described with respect to FIG. 5. The rotated map view 820 may be generated based on the deviation coordinates of each corner of the portion of the map, the parameters of the virtual map camera, and the principal point of the portion of the map.

In some embodiments, the GUI engine 320 displays the oblique image 810 overlaid on the rotated map view 820. For example, the GUI engine 320 displays the oblique image 810 such that the feature 812 is displayed overlapping the location 822, when the oblique image 810 is overlaid on the rotated map view 820. By using the oblique tile generated by the oblique tile module 305 for the oblique image 810 and the associated geographic region, the GUI engine 320 may overlay the oblique image 810 on the rotated map view 820, without significantly warping the oblique image 810. In other embodiments, the GUI engine 320 displays the oblique image 810 side-by-side with the rotated map view 820. In other embodiments, the GUI engine 320 displays the oblique image 810 in response to receiving a user input selecting a geographic location shown on the rotated map view 820.

Figure 9:
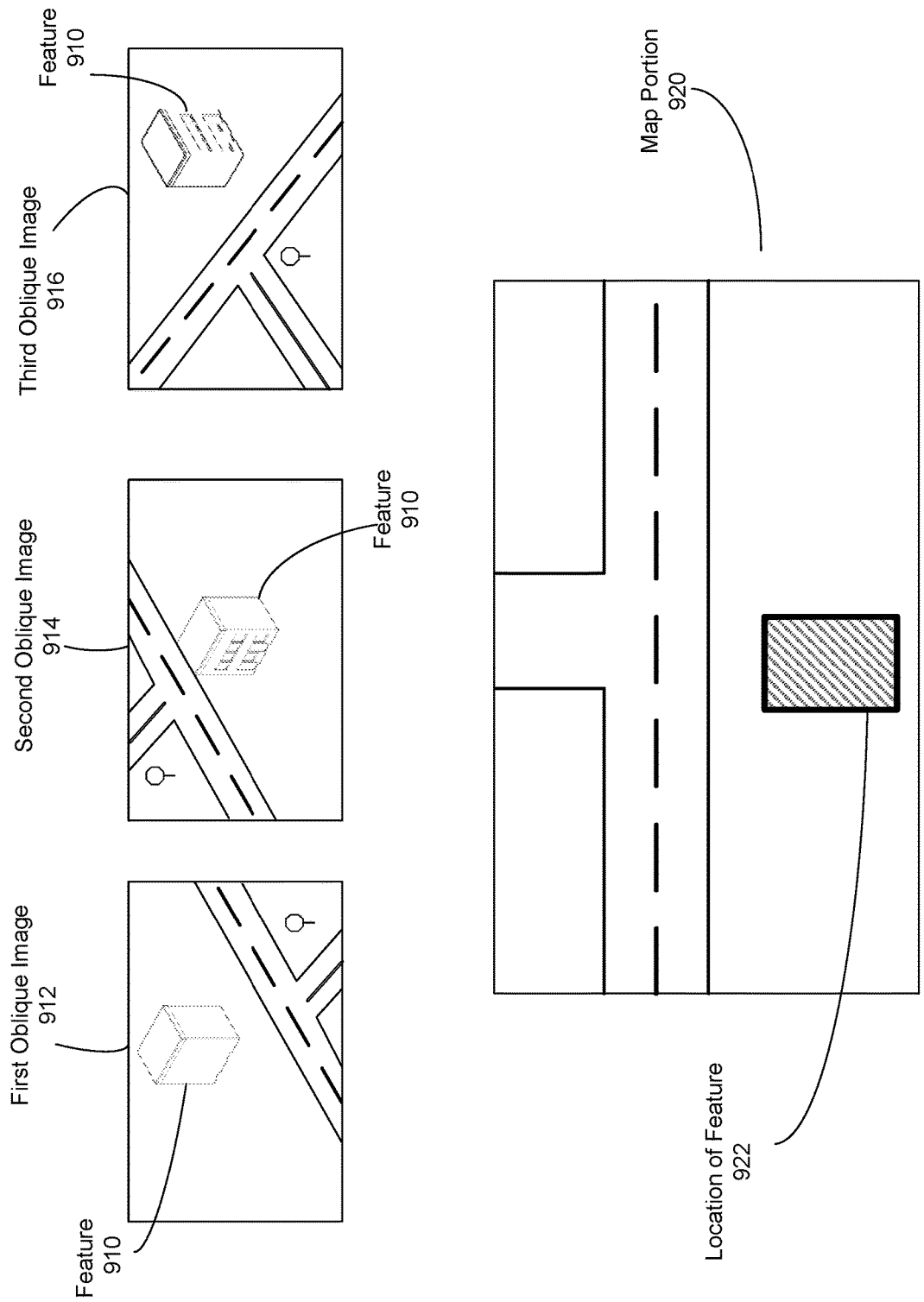
FIG. 9 is an example of a set of oblique images and a corresponding portion of a map, in accordance with some embodiments.

FIG. 9 is an example of a set of oblique images and a corresponding portion of a map, in accordance with some embodiments. In this example, the oblique tile module 305 associates three oblique images 912, 914, and 916 with a same map tile, using the methods described above to generate a set of oblique tiles. Each oblique image of the set of oblique images depicts a different perspective of one or more features located at the geographic coordinates corresponding to the map tile and is captured by a different oblique camera, or by an oblique camera taking photographs at different positions. Also, each of the oblique images 912, 914, and 916 are associated with the same map tile, including geographic coordinates corresponding to the same geographic region, and each of the set of oblique tiles generated include data corresponding the respective oblique image to the same map tile. Each of the oblique images 912, 914, and 916 shows a different perspective (also referred to herein as an "oblique view") of the feature 910 (a building, in the example shown in FIG. 9).

The GUI engine 320 displays, in an interface, a map portion 920 showing the geographic region corresponding to geographic coordinates that include a location of the feature 922. The GUI engine 320 may display at least one of the set of oblique images 912, 914, and 916 simultaneously with the map portion 920. In some embodiments, the GUI engine 320 displays the first oblique image 912, and displays a different one of the set of oblique images (e.g., the second oblique image 914 or the third oblique image 916) in response to receiving a user input associated with changing the display of the first oblique image 912. By using the interface provided by the GUI engine 320, a user may switch between multiple perspectives of a feature or a portion of a geographic region of interest shown on the portion of the map 920. In other embodiments, all of the set of oblique images are displayed simultaneously with the associated map portion 920.

Estimating a Height of a Feature in an Oblique Image

Figure 10:
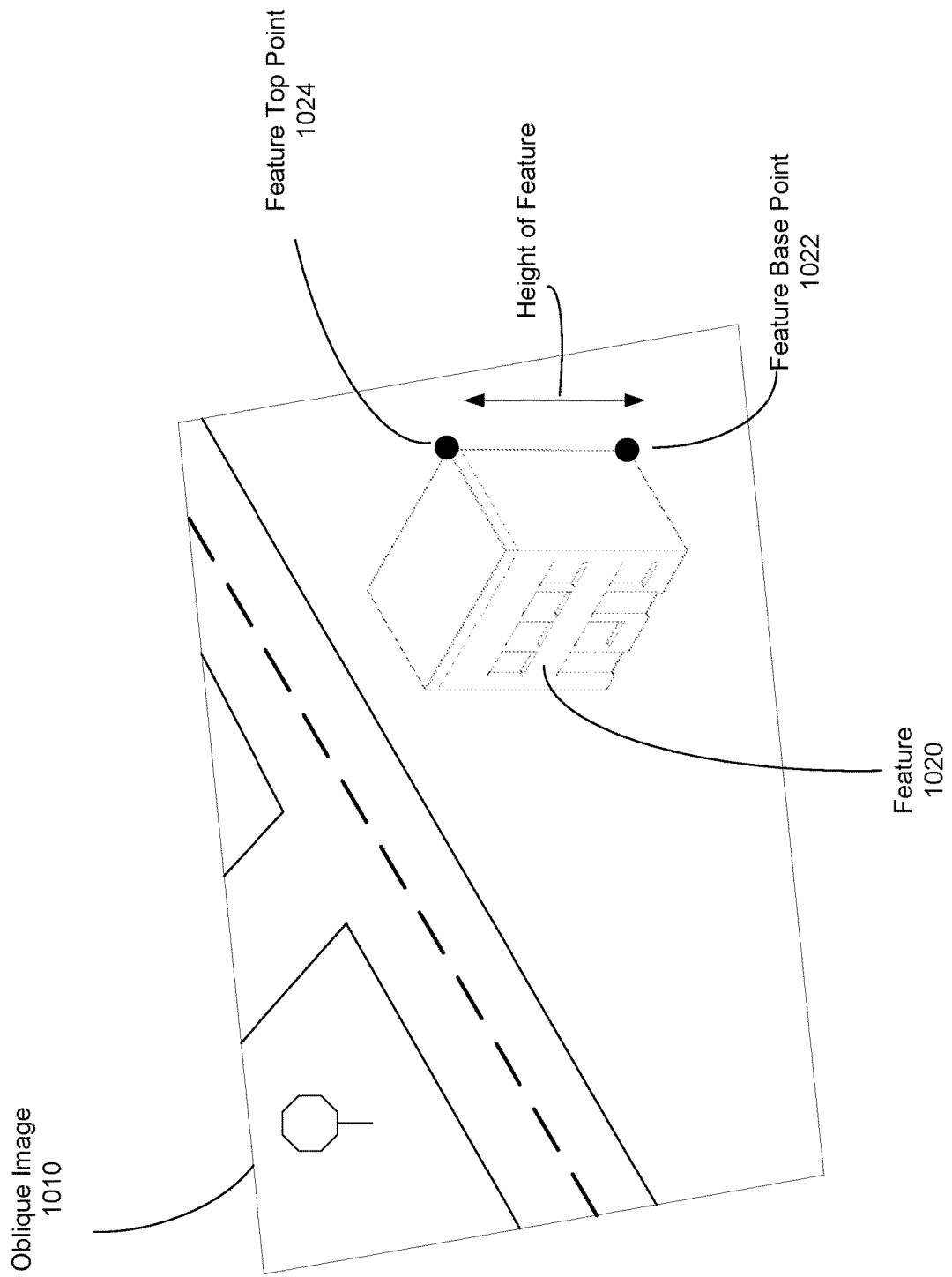
FIG. 10 is an example of using an oblique tile to estimate a height of a feature in the oblique image, in accordance with some embodiments.

FIG. 10 is an example of using an oblique tile to estimate a height of a feature in the oblique image, in accordance with some embodiments. In some embodiments, an oblique tile generated by the oblique imagery application 110 is used to estimate a height of a feature 1020 depicted in the oblique image 1010. In the example shown in FIG. 10, the feature 1020 is a building. In order to estimate the height of the feature 1020, the height estimation module 350 receives, as a first input, a first pixel on the oblique image 1010 corresponding to a base point 1022 of the feature 1020 and receives, as a second input, a second pixel on the oblique image 1010 corresponding to a top point 1024 of the feature 1020. In some embodiments, a user provides inputs indicating the base point 1022 and the top point 1024 through the interface provided by the GUI engine 320. For example, a user may click on a pixel corresponding to the base point 1022, drag the mouse up to the top point 1024, and release the mouse click at the top point 1024. In other embodiments, a computer vision model analyzes the oblique image and provides the inputs indicating the base point 1022 and the top point 1024 of a feature. For example, the computer vision model may be trained to identify buildings in an oblique image and generate the inputs for the base point 1022 and the top point 1024 of the building.

The height estimation module 350 retrieves elevation data from an elevation database corresponding to the map tile, to determine a ground plane elevation of the map tile based on the retrieved elevation data. In some embodiments, the elevation database is separate from the database 140. For example, the elevation database may be a third-party database that the height estimation module 350 accesses. In other embodiments, the elevation database is included in the database 140. The ground plane elevation of the map tile may be determined by averaging the elevation of the corners of the geographic region corresponding to the map tile, according to some embodiments. By averaging the elevation of the geographic locations corresponding to each corner of the geographic region, an average ground plane elevation is determined for estimating the height of the feature 1020.

Figure 11:
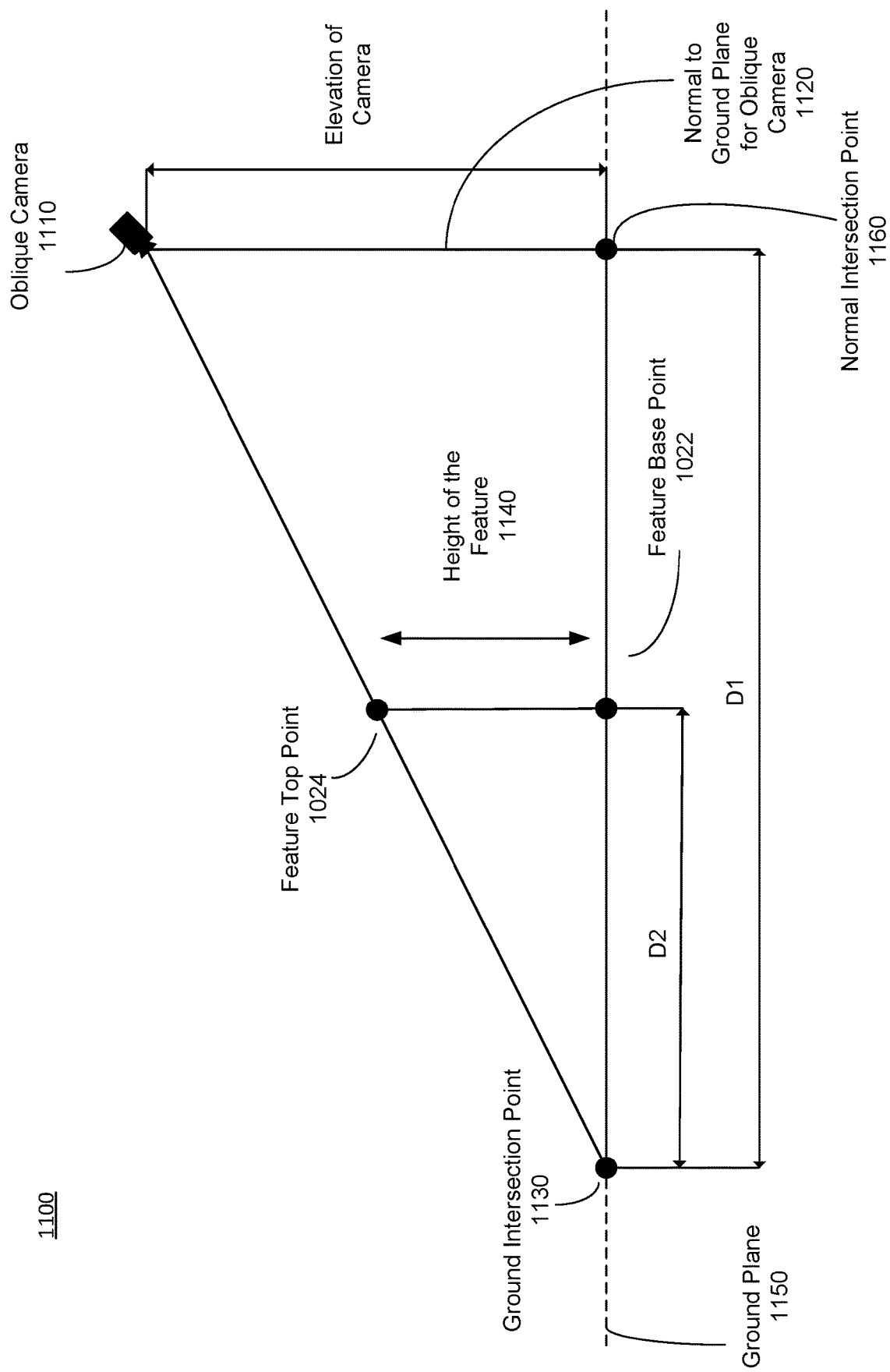
FIG. 11 is a diagram showing the estimation of the height of the feature of the oblique image shown in FIG. 10, in accordance with some embodiments.

FIG. 11 is a diagram showing the estimation of the height of the feature of the oblique image shown in FIG. 10, in accordance with some embodiments. The diagram 1100 includes the geometry used to estimate the height of the feature 1020 based on the retrieved elevation data and the oblique tile. The height estimation module 350 determines the elevation of the oblique camera 1110 based on the spatial position of the oblique camera 1110 (included in the oblique camera parameters) and the ground plane elevation of the map tile. The height estimation module 350 also determines the normal to the ground plane 1120 from the oblique camera 1110 based on the spatial position of the oblique camera 1110, which is used to determine a normal intersection point 1160. The height estimation module 350 determines geographic coordinates corresponding to the base point 1022, geographic coordinates corresponding to a normal intersection point 1160 where the normal to ground plane 1120 intersects the ground plane 1150, and geographic coordinates corresponding to a ground intersection point 1130.

The ground intersection point 1130 is defined as a location where a line from the oblique camera 1110 passing through the feature top point 1024 intersects the ground plane 1150 of the map tile. The geographic coordinates associated with the pixel corresponding to the top point 1024 by the oblique tile module 305 are the geographic coordinates of the ground intersection point 1130. This is due to the oblique tile module 305 associating the geographic coordinates along the ground or ground plane 1150 (in a region behind the feature, with respect to the perspective of the oblique camera 1110) with the pixels of the oblique image 1010 corresponding to the feature 1020.

The height estimation module 350 determines a distance D1 between the ground intersection point 1130 and the normal to the ground plane 1120 based on the determined geographic coordinates for the ground intersection point 1130 and the normal intersection point 1160. The height estimation module 305 determines a distance D2 between the ground intersection point 1130 and the feature base point 1022 based on the determined geographic coordinates of the ground intersection point 1130 and the feature base point 1022. Since the feature top point 1024, the feature base point 1022, and the ground intersection point 1130 form a similar triangle to the triangle formed by the oblique camera 1110, the ground intersection point 1130, and the normal intersection point 1160, the ratio of D1 to the elevation of the oblique camera 1110 and the ratio of D2 to the height of the feature 1140 are the same. Thus, the height estimation module 305 estimates the height of the feature 1140 based on the determined D1, D2, and the elevation of the oblique camera 1110.

According to some embodiments, the oblique imagery application 110 determines the estimated height of the feature 1140 based on a first geographic coordinate associated with the first pixel, a second geographic coordinate corresponding to the second pixel, the position of the oblique camera 1110, and the estimated ground plane elevation. The GUI engine 320 then provides the estimated height of the feature 1140 for display in an interface. In further embodiments, the GUI engine 320 displays the height of the feature 1140 overlaid on the oblique image 1010.

Generating an Oblique Tile

Figure 12:
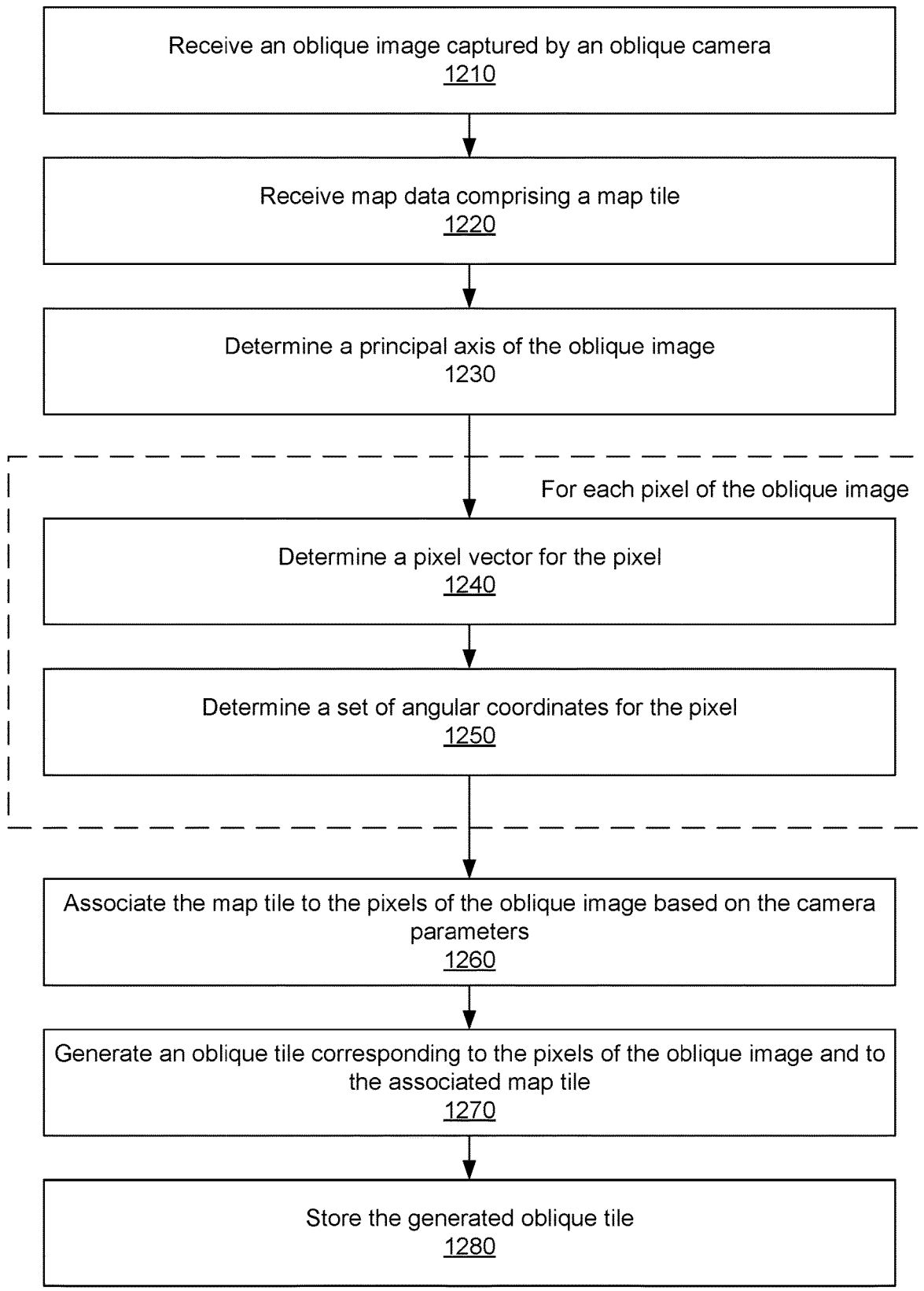
FIG. 12 is a flow chart showing a process of generating an oblique tile corresponding to an oblique image and an associated map tile.

FIG. 12 is a flow chart of generating an oblique tile corresponding to an oblique image and an associated map tile. The oblique imagery application 110 receives 1210 an oblique image captured by an oblique camera. The oblique image is captured at a non-orthogonal angle with respect to a ground plane. The oblique camera is associated with oblique camera parameters including a position of the oblique camera, an angular orientation of the oblique camera, and a focal point of the camera.

The oblique imagery application 110 receives 1220 map data including a map tile corresponding to geographic coordinates. The geographic coordinates correspond to a geographic region, part of which is depicted in the oblique image. A principal axis is determined 1230 for the oblique image in three-dimensional space. The principal axis is orthogonal to an image plane defined by the oblique image, and the principal axis intersects a center of the oblique image. For each pixel of the oblique image, a pixel vector is determined 1240 and a set of deviation coordinates is determined 1250 for the pixel. The pixel vector of a pixel originates at the focal point of the oblique camera and ends at the pixel. The set of deviation coordinates of a pixel are based on a deviation of the pixel vector for the pixel from the principal axis.

The map tile is then associated 1260 to the pixels of the oblique image based on the camera parameters based on the deviation coordinates of the pixels, the oblique camera parameters, and the geographic coordinates of the map tile. Each pixel is associated with a geographic coordinate of the map tile, in some embodiments. The oblique imagery application 110 generates 1270 an oblique tile corresponding to the pixels of the oblique image and to the associated map tile. The oblique tile is stored 1280 (e.g., in the database 140).

The stored oblique tile may be accessed for use by the GUI engine 320 to display oblique images and to display portions of a map associated with the oblique images. By using the method shown in FIG. 12, the oblique images can be displayed in an interface, without warping the oblique images. Since the association of the pixels of the oblique image with the map tile is based on the deviation coordinates for the pixels, efficient calculation of the geographic coordinates associated with the pixels can be performed without the need for complex and/or computationally expensive calculations of the 3D geometry for each pixel vector. In some embodiments, this is carried out by an affine transformation, as described above.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising:
receiving an oblique image comprising a plurality of pixels and captured at a non-orthogonal angle with respect to a ground plane by an oblique camera associated with oblique camera parameters, the oblique camera parameters comprising a position of the oblique camera, an angular orientation of the oblique camera, and a focal point of the camera;
receiving map data comprising a map tile corresponding to geographic coordinates;
determining a principal axis in three-dimensional space, the principal axis orthogonal to an image plane defined by the oblique image and intersecting a center of the oblique image;
determining, for each of the plurality of pixels, a pixel vector passing through the focal point of the oblique camera and ending at the pixel;
determining, for each of the plurality of pixels, a set of deviation coordinates based on a deviation of the pixel vector for the pixel from the principal axis;
associating the map tile to the plurality of pixels of the oblique image based on the deviation coordinates of the pixels, the oblique camera parameters, and the geographic coordinates;
generating an oblique tile corresponding to the pixels of the oblique image and to the associated map tile; and
storing the generated oblique tile.

2. The method of claim 1, wherein, for each of the plurality of pixels:
the deviation coordinates estimate the deviation of the pixel vector for the pixel from the principal axis based on a deviation of a pixel unit vector from a principal vector,
the pixel unit vector is a vector having a same length as the distance from the focal point of the camera to the image plane,
the pixel unit vector originates at the focal point of the camera and points towards the pixel, following a line that intersects both the focal point of the camera and the pixel, and
the principal vector originates at the focal point of the camera and ends at the center of the oblique image.

3. The method of claim 1, further comprising:
providing the oblique image and a portion of a map corresponding to the map tile for simultaneous display in a user interface.

4. The method of claim 3, further comprising generating the portion of the map for display as an oblique map view, the oblique map view having a perspective corresponding to the non-orthogonal angle of the oblique image.

5. The method of claim 4, further comprising:
determining parameters for a virtual map camera comprising a position, an angular orientation, and a focal point of the virtual map camera, the parameters of the virtual map camera based on the oblique camera parameters, the virtual map camera used to determine the oblique map view of the portion of the map for display;
determining a principal point on the portion of the map, the principal point corresponding to the center of the oblique image; and
for each corner of the portion of the map:
determining a set of deviation coordinates for the corner,
wherein the oblique map view is generated based on the deviation coordinates of each corner of the portion of the map, the parameters for the virtual map camera, and the principal point on the portion of the map.

6. The method of claim 1, further comprising:
associating a plurality of oblique images with the map tile, each oblique image depicting a different perspective of one or more features located at the geographic coordinates corresponding to the map tile; and
generating a plurality of oblique tiles based on the oblique images, each oblique tile corresponding to one of the plurality of oblique images and corresponding to the map tile.

7. The method of claim 6, further comprising:
providing for display in a user interface a first oblique image of the plurality of oblique images corresponding to the map tile; and
responsive to receiving an input associated with changing the display of the first oblique image, displaying a second oblique image of the plurality of oblique images corresponding to the map tile, the second oblique image providing an alternate oblique view of the one or more features.

8. The method of claim 1, wherein the oblique camera parameters further comprise at least one of an image size, a pixel size, a focal length, and a location of a principal point.

9. The method of claim 1, wherein the determining the pixel vectors for each of the pixels of the oblique image comprises applying an affine transformation to the oblique image.

10. The method of claim 1, further comprising:
retrieving elevation data from an elevation database corresponding to the map tile;
determining an estimated ground plane elevation of the map tile based on the retrieved elevation data;
receiving a first input indicating a first pixel on the oblique image corresponding to a base point of a feature depicted in the oblique image;
receiving a second input indicating a second pixel on the oblique image corresponding to a top point of the feature;
determining an estimated height of the feature depicted in the oblique image based on a first geographic coordinate associated with the first pixel, a second geographic coordinate corresponding to the second pixel, the position of the oblique camera, and the estimated ground plane elevation; and
providing the estimated height of the feature depicted in the oblique image for display.

11. The method of claim 1, wherein the set of deviation coordinates comprises angular coordinates including a latitude coordinate indicating a vertical deviation of the pixel vector from the principal axis and a longitude coordinate indicating a horizontal angular deviation from the principal axis.

12. A non-transitory computer readable storage medium storing executable instructions that, when executed by one or more processors, cause the one or more processors to perform steps comprising:
receiving an oblique image comprising a plurality of pixels and captured at a non-orthogonal angle with respect to a ground plane by an oblique camera associated with oblique camera parameters, the oblique camera parameters comprising a position of the oblique camera, an angular orientation of the oblique camera, and a focal point of the camera;
receiving map data comprising a map tile corresponding to geographic coordinates;
determining a principal axis in three-dimensional space, the principal axis orthogonal to an image plane defined by the oblique image and intersecting a center of the oblique image;
determining, for each of the plurality of pixels, a pixel vector passing through the focal point of the oblique camera and ending at the pixel;
determining, for each of the plurality of pixels, a set of deviation coordinates based on a deviation of the pixel vector for the pixel from the principal axis;

associating the map tile to the plurality of pixels of the oblique image based on the deviation coordinates of the pixels, the oblique camera parameters, and the geographic coordinates;
generating an oblique tile corresponding to the pixels of the oblique image and to the associated map tile; and
storing the generated oblique tile.

13. The non-transitory computer readable storage medium of claim 12, wherein, for each of the plurality of pixels:
the deviation coordinates estimate the deviation of the pixel vector for the pixel from the principal axis based on a deviation of a pixel unit vector from a principal vector,
the pixel unit vector is a vector having a same length as the distance from the focal point of the camera to the image plane, and
the pixel unit vector originates at the focal point of the camera and points towards the pixel, following a line that intersects both the focal point of the camera and the pixel, and
the principal vector originates at the focal point of the camera and ends at the center of the oblique image.

14. The non-transitory computer readable storage medium of claim 12, the steps further comprising:
providing the oblique image and a portion of a map corresponding to the map tile for simultaneous display in a user interface.

15. The non-transitory computer readable storage medium of claim 14, the steps further comprising generating the portion of the map for display as an oblique map view, the oblique map view having a perspective corresponding to the non-orthogonal angle of the oblique image.

16. The non-transitory computer readable storage medium of claim 15, the steps further comprising:
determining parameters for a virtual map camera comprising a position, an angular orientation, and a focal point of the virtual map camera, the parameters of the virtual map camera based on the oblique camera parameters, the virtual map camera used to determine the oblique map view of the portion of the map for display;
determining a principal point on the portion of the map, the principal point corresponding to the center of the oblique image; and
for each corner of the portion of the map:
determine a set of deviation coordinates for the corner, wherein the oblique map view is generated based on the deviation coordinates of each corner of the portion of the map, the parameters for the virtual map camera, and the principal point on the portion of the map.

17. The non-transitory computer readable storage medium of claim 12, the steps further comprising:
associating a plurality of oblique images with the map tile, each oblique image depicting a different perspective of one or more features located at the geographic coordinates corresponding to the map tile; and
generating a plurality of oblique tiles based on the oblique images, each oblique tile corresponding to one of the plurality of oblique images and corresponding to the map tile.

18. The non-transitory computer readable storage medium of claim 17, the steps further comprising:
providing for display in a user interface a first oblique image of the plurality of oblique images corresponding to the map tile; and
responsive to receiving an input associated with changing the display of the first oblique image, displaying a second oblique image of the plurality of oblique images corresponding to the map tile, the second oblique image providing an alternate oblique view of the one or more features.

19. The non-transitory computer readable storage medium of claim 12, wherein the oblique camera parameters further comprise at least one of an image size, a pixel size, a focal length, and a location of a principal point.

20. The non-transitory computer readable storage medium of claim 12, wherein the determining the pixel vectors for each of the pixels of the oblique image comprises applying an affine transformation to the oblique image.

21. The non-transitory computer readable storage medium of claim 12, the steps further comprising:
    retrieving elevation data from an elevation database corresponding to the map tile;
    determining an estimated ground plane elevation of the map tile based on the retrieved elevation data;
    receiving a first input indicating a first pixel on the oblique image corresponding to a base point of a feature depicted in the oblique image;
    receiving a second input indicating a second pixel on the oblique image corresponding to a top point of the feature;
    determining an estimated height of the feature depicted in the oblique image based on a first geographic coordinate associated with the first pixel, a second geographic coordinate corresponding to the second pixel, the position of the oblique camera, and the estimated ground plane elevation; and
    providing the estimated height of the feature depicted in the oblique image for display.

22. The non-transitory computer readable storage medium of claim 12, wherein the set of deviation coordinates comprises angular coordinates including a latitude coordinate indicating a vertical deviation of the pixel vector from the principal axis and a longitude coordinate indicating a horizontal angular deviation from the principal axis.

\* \* \* \* \*